United States Patent [19]

Nielsen

[11] Patent Number: 5,948,054
[45] Date of Patent: *Sep. 7, 1999

[54] METHOD AND SYSTEM FOR FACILITATING THE EXCHANGE OF INFORMATION BETWEEN HUMAN USERS IN A NETWORKED COMPUTER SYSTEM

[75] Inventor: Jakob Nielsen, Atherton, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,716

[22] Filed: Feb. 27, 1996

[51] Int. Cl.$^6$ .............................. G06F 13/00; G06F 13/14
[52] U.S. Cl. ........................ 709/200; 709/202; 709/203; 709/206; 709/207; 709/217; 709/219; 709/227; 707/10; 707/104; 705/8; 705/9
[58] Field of Search ....................... 395/200.01, 200.02, 395/200.03, 200.09, 207, 209, 604, 605, 759, 762, 793, 200.3, 200.32, 200.33, 200.47–200.5, 200.59, 609, 610, 615, 200; 709/200–203, 206–207, 217, 219, 227–229, 3–6; 707/9–10, 100–104; 705/7–9

[56] References Cited

U.S. PATENT DOCUMENTS

| | | | |
|---|---|---|---|
| 5,164,897 | 11/1992 | Clark et al. | 705/1 |
| 5,329,619 | 7/1994 | Page et al. | 709/227 |
| 5,386,556 | 1/1995 | Hedin et al. | 707/4 |
| 5,404,523 | 4/1995 | DellaFera et al. | 709/304 |
| 5,493,677 | 2/1996 | Balogh et al. | 707/104 |
| 5,572,643 | 11/1996 | Judson | 707/513 |
| 5,592,375 | 1/1997 | Salmon et al. | 705/7 |
| 5,603,029 | 2/1997 | Aman et al. | 707/200 |
| 5,664,126 | 9/1997 | Hirakawa et al. | 709/203 |
| 5,678,041 | 10/1997 | Baker et al. | 709/229 |
| 5,710,887 | 1/1998 | Chelliah et al. | 709/217 |
| 5,765,033 | 6/1998 | Miloslavsky | 709/200 |
| 5,774,660 | 6/1998 | Brendel et al. | 709/202 |

OTHER PUBLICATIONS

Tschammer et al, "The Performance of Multiple Traders Operating in the Same Domain", Future Trends of Distributed Computing Systems, '91 Workshop, 1992 IEEE, pp. 122–128.

*Primary Examiner*—Zarni Maung
*Assistant Examiner*—Bharat Barot
*Attorney, Agent, or Firm*—Sabath & Truong

[57] ABSTRACT

In a networked computer system including a customer computer associated with a human customer, one or more consultant computers associated with one or more human consultants, and a server computer, the human customer sends an information request to the server via the customer computer. The request, which includes a question that the customer wishes to have answered, does not specify a consultant from which the answer may be obtained. In response, the server determines which one or ones of the consultants is qualified to provide the requested information. The server then solicits the requested information from one or more of the qualified consultants. If at least one of the qualified consultants decides to provide the requested information, then the server receives the information from the consultant via one of the consultant computers. Thereafter, the server sends the information to the customer via the customer computer. In this manner, the server matches the human customer with the question with a human consultant with the answer. By doing so, the sever enables the customer to obtain an answer to his question without knowing up front which consultant has sufficient knowledge to provide the answer.

18 Claims, 12 Drawing Sheets

METHOD AND SYSTEM FOR FACILITATING THE EXCHANGE OF INFORMATION BETWEEN HUMAN USERS IN A NETWORKED COMPUTER SYSTEM

FIELD OF THE INVENTION

The present invention relates to the area of information retrieval, and, more specifically, to information retrieval in a network-based computer system.

BACKGROUND OF THE INVENTION

Companies often have fairly specific questions they would like to have answered. Often, they are willing to pay some amount of money to get the answer rapidly from someone outside the company instead of having to research the issue using employees of the company. This is often true because the expense, in engineering time, is greater than the cost of hiring a consultant who knows the answer already.

However, in practice, a number of problems arise which make it impractical to hire outside consultants. First, the transaction costs of getting a consultant are much too large for most practical questions. The customer typically has to spend time researching the available consultants (e.g., reading a consultants' directory) which often takes more time than simply researching the answer to the question, and the customer and the consultant have to agree on a contract (again, not really worth doing for a job that might cost $100).

A second problem is that appropriate consultants may often be in other countries than the one where the customer is located. Using traditional approaches would involve the overhead of getting a work permit and/or international fund transfers which again would be more trouble than its worth for a small transaction.

Embodiments of the present invention provide a method and system to minimize transaction costs by using the World Wide Web ("the web") to match customers with questions to consultants with answers.

A third problem is that the customer is not anonymous. Sometimes, just knowing that a certain company has a certain question can give insights into their future strategy. Consultants normally work under a confidentiality agreement, but by providing complete anonymity, embodiments of the present invention work better than solutions used in the prior art.

SUMMARY OF THE INVENTION

Embodiments of the present invention provide an improved method and system for matching customers with questions to consultants with answers. The preferred embodiment of the present invention is perhaps best described by way of example. First, a customer with a question connects to a world wide web server which offers the matchmaking service. Then the customer fills in a form with a natural language description of the question. The customer also checks one or more checkboxes to classify the question according to a set of pre-defined categories (e.g., is this a question about C programming or C++ programming?). Finally, the customer provides his or her email address. This email address is stored by the server but is not communicated to the consultant answering the question, thus providing anonymity for the customer.

The matchmaking service posts the question on personal web pages for consultants who have the background to answer the question. To determine which consultants have the background to answer a given question, the matchmaking service maintains a database of consultants who are willing to answer questions. For each consultant, the database has a description of that consultant's area of expertise in terms of the categories used by the customers to classify their questions and in terms of a natural language description of the consultant's abilities. The matchmaking service preferably matches a question to consultants by first selecting those who are experts in the categories checked by the customer. Second, it computes similarity ratings between the natural language part of the question and the natural language description of the consultants chosen by the first step. Similarity ratings are preferably computed by latent semantic indexing if available and otherwise by simple frequency-weighted term-matching. The question is then posted to the personal web pages for consultants with the highest similarity ratings.

When a consultant is interested in answering a question, he or she connects to the matchmaking service's web server and enters a login name and a password to uniquely identify him or herself to the server. For each consultant, the server maintains a web page with questions that have been deemed similar to that consultant's expertise. The consultant scans the questions. If no questions appeal to the consultant, he or she logs off from the server. The matchmaking service notes the questions posted to the consultant's personal web page that are not going to be answered by that consultant, and posts those questions to a personal web page for the consultant with the best similarity score that has not already been given the opportunity to answer the question. If all consultants who are qualified to answer the question turn it down, the service emails the user an apology.

If a consultant finds a question on his or her page that he or she wants to answer, the consultant clicks a button next to the question, causing a message to be transmitted to the server which "reserves" the question for that consultant and removes it from the personal web pages for the other consultants. The consultant types up the answer to the question and returns it to the server. The server looks up the customer's email address in its database and forwards the answer to the customer who is billed for the service.

In this way, an improved method and system for matching customers with questions to consultants with answers is provided.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview Of The Preferred Method

Embodiments of the present invention provide an improved method and system for matching customers with questions to consultants with answers. The preferred embodiment of the present invention is perhaps best described by way of example. First, a customer with a question connects to a world wide web server which offers the matchmaking service. Then the customer fills in a form with a natural language description of the question. The customer also checks one or more checkboxes to classify the question according to a set of pre-defined categories (e.g., is this a question about C programming or C++ programming?). The customer also provides payment information: either a credit card number, an account number (if the customer has an account with the matchmaking service), or the customer's general payment method for Internet commerce. Finally, the customer provides his or her email address. This email address is stored by the server but is not communicated to the consultant answering the question, thus providing anonymity for the customer. Optionally, the customer might be given the ability to place a higher priority on the question to have it answered faster in return for a higher fee.

The matchmaking service uses an appropriate mechanism to verify the customer's ability to pay (either by contacting the credit card issuer, by checking its own account system, or by contacting an Internet commerce server). Assuming that the customer is determined to be an adequate credit risk, the matchmaking service posts the question on personal web pages for consultants who have the background to answer the question.

To determine which consultants have the background to answer a given question, the matchmaking service maintains a database of consultants who are willing to answer questions. For each consultant, the database has a description of that consultant's area of expertise in terms of the categories used by the customers to classify their questions and in terms of a natural language description of the consultant's abilities. The matchmaking service preferably matches a question to consultants by first selecting those who are experts in the categories checked by the customer. Second, it computes similarity ratings between the natural language part of the question and the natural language description of the consultants chosen by the first step. Similarity ratings are preferably computed by latent semantic indexing if available and otherwise by simple frequency-weighted term-matching. The question is then posted to the personal web pages for consultants with the highest similarity ratings.

When a consultant is interested in answering a question, he or she connects to the matchmaking service's web server and enters a login name and a password to uniquely identify him or herself to the server. For each consultant, the server maintains a web page with questions that have been deemed similar to that consultant's expertise. The consultant scans the questions (possibly noting whether the web page displays any high-priority questions that would pay extra for a fast answer). If no questions appeal to the consultant, he or she logs off from the server. The matchmaking service notes the questions posted to the consultant's personal web page which are not going to be answered by that consultant, and instead posts those questions to a personal web page for the consultant with the best similarity score that has not already been given the opportunity to answer the question. If all consultants who are qualified to answer the question turn it down, the service emails the user an apology.

If a consultant finds a question on his or her page that he or she wants to answer, the consultant clicks a button next to the question, causing a message to be transmitted to the server which "reserves" the question for that consultant and removes it from the personal web pages for the other consultants. The consultant types up the answer to the question and returns it to the server. The server looks up the customer's email address in its database and forwards the answer to the customer who is billed for the service.

In a preferred embodiment the server also sends the customer a satisfaction survey, asking the customer to rate the quality of the answer on a sliding scale. The consultant's payment for the job may partly be dependent on the customer's satisfaction. A consultant who consistently receives poor scores is removed from the service.

Occasionally, the consultant may need to ask clarifying questions of the customer before answering the question. To preserve the customer's anonymity, these messages are not sent directly between the consultant and the customer but are gatewayed through the matchmaking service which maintains a database of both email addresses.

In this way, an improved method and system for matching customers with questions to consultants with answers is provided.

Overview Of The Preferred System

Figure 1:
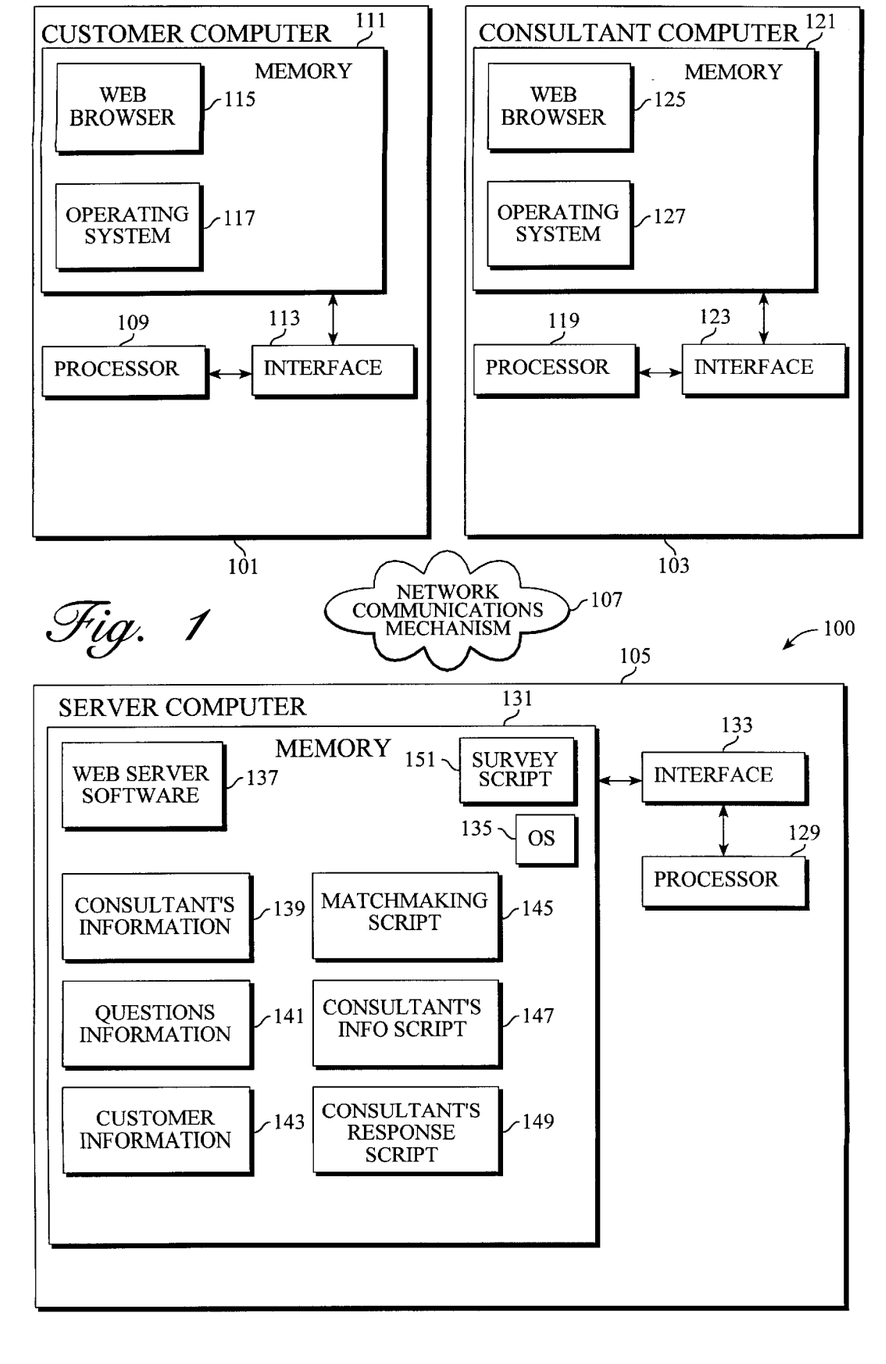
FIG. 1 is a block diagram of a computer system for practicing the preferred embodiment of the present invention.

FIG. 1 is a block diagram of a computer system 100 for practicing the preferred embodiment of the present invention. The computer system 100 includes a customer computer 101, a consultant computer 103, a server computer 105, and a network communications mechanism 107.

The customer computer 101 includes a processor 109, a memory 111, and an interface 113 for facilitating input and output in the customer computer 101. The memory 111 stores a number of items, including a browser 115, and an operating system 117. The preferred browser is a Java™ enabled browser such as Hot Java™ from Sun Microsystems, Inc., of Mountain View, Calif.1. The preferred operating system is the Solaris™ operating system from Sun Microsystems, Inc. The network communications mechanism 107 provides a mechanism for facilitating communication between the customer computer 101, the consultant 103, and the server 105.

1. Sun and Solaris are trademarks or registered trademarks of Sun Microsystems, Inc., in the United States and other countries.

The consultant computer 103 includes a processor 119, a memory 121, and an interface 123 for facilitating input and output in the source computer 103. The memory 121 stores a number of items, including a web browser 125, and an operating system 127. The preferred operating system is the Solaris™ operating system from Sun Microsystems, Inc. of Mountain View, Calif. The preferred browser is a Java™ enabled browser such as Hot Java™ from Sun Microsystems, Inc.

The server computer 105 includes a processor 129, a memory 131, and an interface 133 for facilitating input and output in the destination computer 105. The memory 131 stores a number of items, including an operating system 135 and web server software 137. The preferred operating system is the Solaris™ operating system from Sun Microsystems, Inc. of Mountain View, Calif. The web server software facilitates communication with the web browsers 115 and 125 and is typically provided by the developer of the webbrowser 115 and the web browser 125. The memory also includes consultant information 139, question information 141, customer information 143, a matchmaking script 145, a consultant's information script 147, a consultant's response script 149, and a survey script 151.

Figure 2:
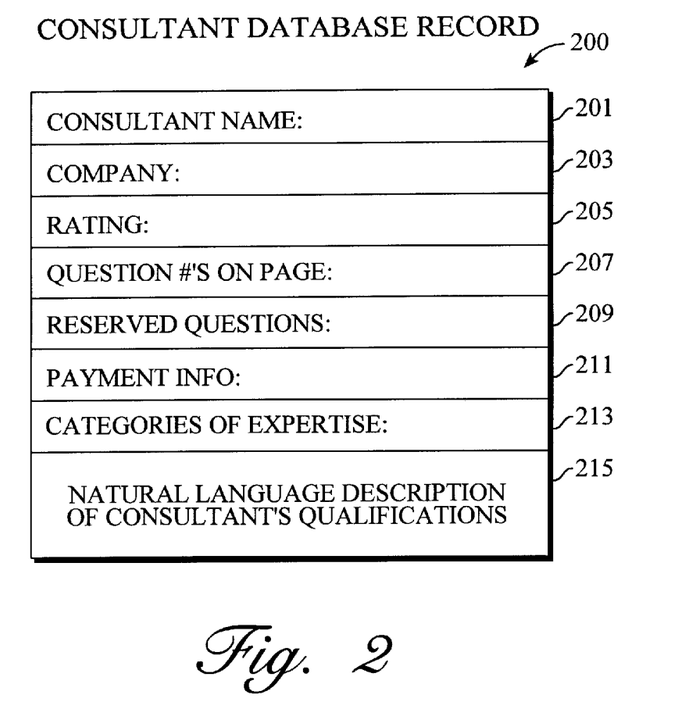
FIG. 2 illustrates a preferred format of a data base record containing information about the consultant.

FIG. 2 illustrates a preferred format of a data base record 200 containing the consultant's information 139. Entry 201 contains the consultant's name and entry 203 contains the name of the consultant's company. Entry 205 contains a rating of the consultant's services. Typically, the rating is determined in response to a satisfaction survey completed by each customer that the consultant serves. Entry 207 contains the question number for each question that the consultant is qualified to answer but has not, as yet, decided to reserve or decided to pass on. Entry 209 contains the question number of each question that the consultant has reserved. Reserving a question typically implies that the consultant selecting the question will be given the exclusive opportunity to answer the question. Entry 211 contains payment information for the consultant. For example, it may contain information regarding the amount of money the matchmaking service owes the consultant and it may contain information on the preferred payment plan through which to pay the consultant. Entry 213 lists the categories within which the consultant is qualified to answer questions. Finally, the preferred database record 200 contains, a natural language description 215 of the consultant's qualifications.

Figure 3:
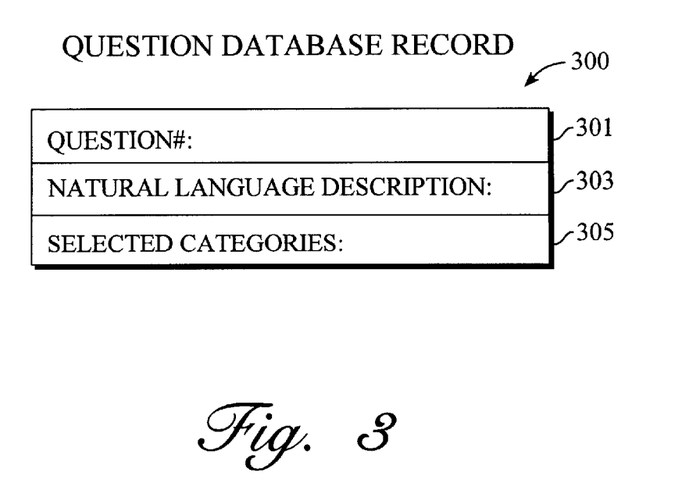
FIG. 3 illustrates a preferred format for storing information about question.

FIG. 3 illustrates a preferred format for storing the questions information 141. When a customer submits a new question into the matchmaking system, information concerning the question is stored in a question database record 300. Entry 301 contains a unique number assigned to the question. Entry 303 contains the natural language description of the question, as entered by the customer. Entry 305 contains a list of the categories that the customer selected as representative of the topic areas covered by the question.

Figure 4:
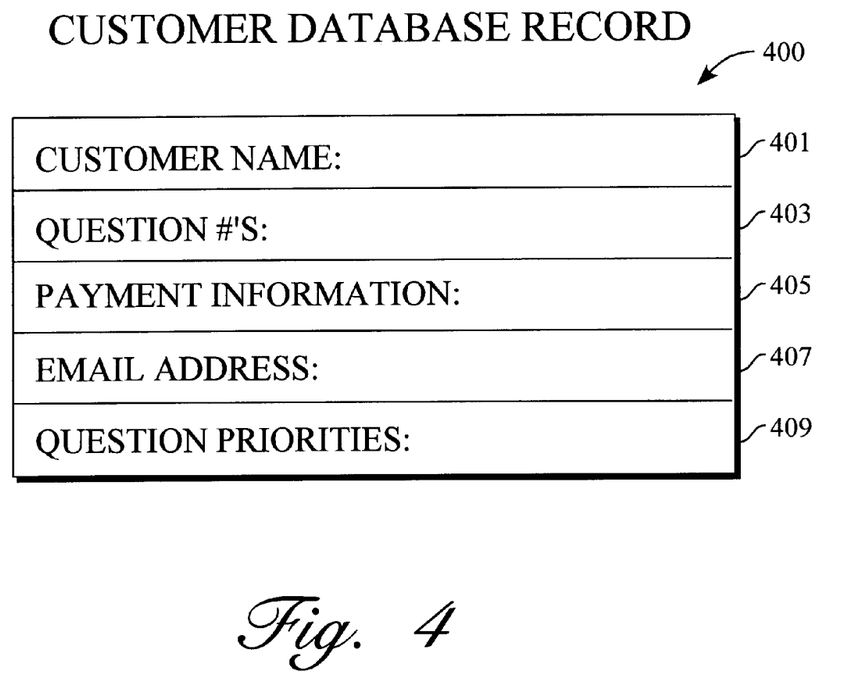
FIG. 4 illustrates a preferred format for storing customer information.

FIG. 4 illustrates a preferred format for storing the customer information 143. The customer data base record 400 contains a number of entries. Entry 401 stores the customer's name. Entry 403 stores one or more unique numbers which identify one or more unique questions which the customer has entered into the matchmaking system. Entry 405 stores payment information for the customer. For example, it may contain information regarding the amount of money the customer owes a consultant and it may contain information on the preferred payment method through which to pay the consultant. Entry 407 contains the email address of the customer. Entry 409 contains any priority settings associated with the one or more questions. Typically the priority settings are set at high, medium, and low.

It should be noted that the customer computer 101, the consultant computer 103, and the server 105 may all contain additional components not shown in FIG. 1. For example, each computer typically includes some combination of additional components including a video display device, an input device, such as a keyboard, mouse, or pointing device, a CD-ROM drive, and a permanent storage device, such as a disk drive.

Detailed Description Of The Preferred Embodiments

Now that the preferred system for practicing the invention has been described, a preferred operation of that system is perhaps best described by reference to the block diagram of FIG. 5 and the flow diagrams of FIGS. 6, 7, 8a, 8b, 9, 10a, 10b, 11, and 12.

Operation of the system typically begins when a customer enters a new question into the system 100. FIG. 5 is a block diagram illustrating a typical matchmaking services web page 500 used by a customer to enter a new question into the system. The web page 500 includes a natural language section 501 for entering the question that the customer wants answered. The web page also contains one or more categories 503 corresponding to the different topic areas which could be covered by the question. The customer selects a checkbox entry corresponding to the categories 503 which are covered by the question. The customer enters information in payment information entry 505 which describes the customer's preferred method for paying the consultant who answers the question (e.g., via credit card). In section 507 the customer enters his or her email address. In section 509 the customer is given the opportunity to give the question a priority level. A high priority level typically corresponds to the customer's willingness to pay a higher fee for a quick answer.

Figure 5:
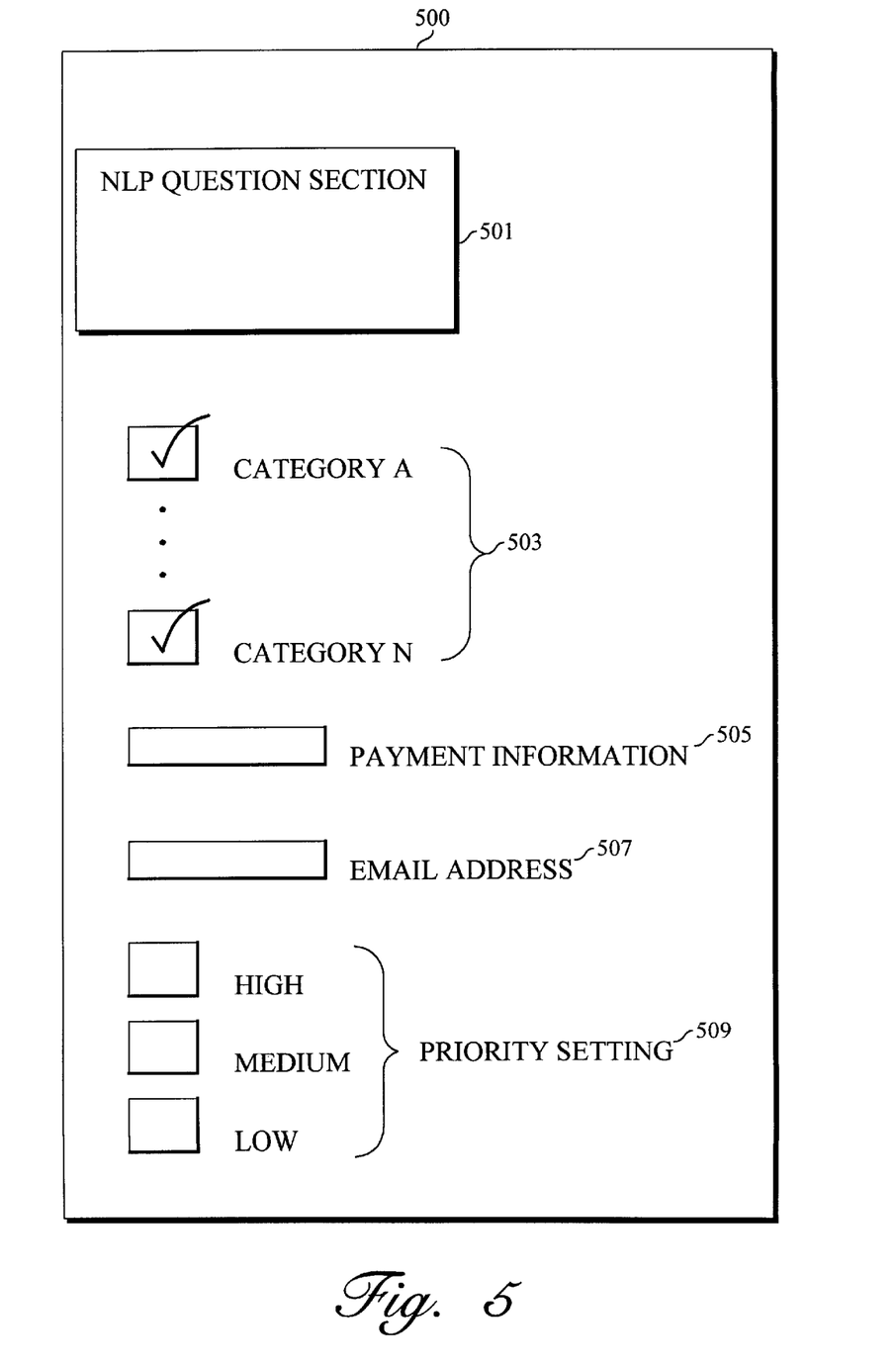
FIG. 5 is a block diagram illustrating a typical matchmaking services web page used by a customer to enter a new question into the system.
Figure 6:
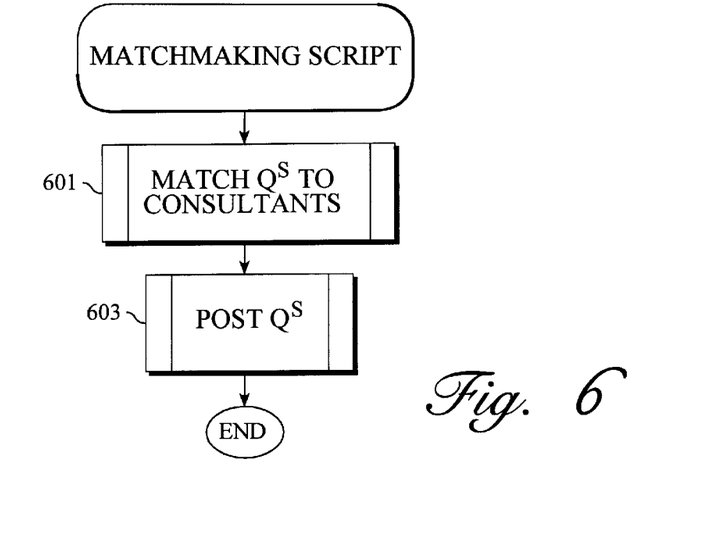
FIG. 6 illustrates a flow diagram of the processing that takes place in a matchmaking script.

FIG. 6 illustrates a flow diagram of the processing that takes place in the matchmaking script 145. The matchmaking script is typically invoked when a new question is submitted through the matchmaking services web page of FIG. 5. The matchmaking script processes the new question to determine which of the consultants are capable of answering the new question. The new question is then posted to a personal web page for at least one of the qualified consultants.

Figure 7:
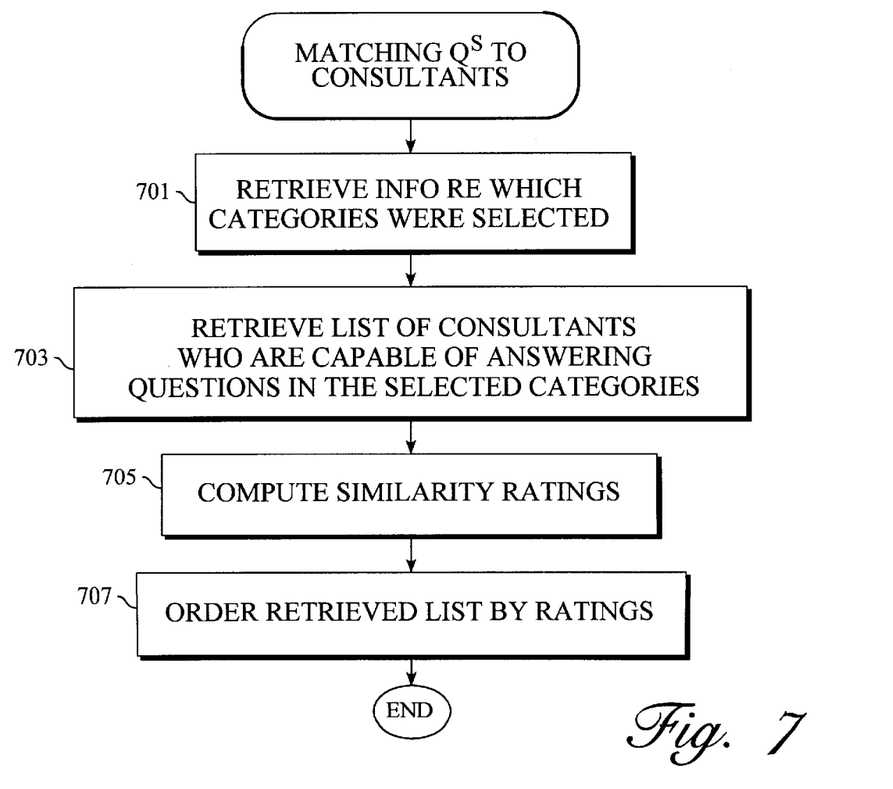
FIG. 7 is a flow diagram of a method which identifies those consultants most qualified to answer a given question.

In step 601 the matchmaking script invokes a method which identifies those consultants who are best qualified to answer the new question. As is discussed in more detail below and as is illustrated in FIG. 7, the method invoked in step 601 processes the information which a customer enters on the matchmaking services web page to determine the type of question being asked. After determining the type of question the method examines the consultants information 139 and selects those consultants that are most qualified to answer the new question. In step 603 the matchmaking script invokes a method which posts the new question to a personal web page for those consultants deemed most qualified to answer the new question. After posting the new question to the consultant's personal web pages, the matchmaking script ends.

FIG. 7 is a flow diagram of a method which identifies those consultants most qualified to answer a given question. In step 701 the method examines the matchmaking services web page and retrieves information regarding which categories were selected by the customer. The categories indicate the topic or subject matters covered by the new question. In step 703 the method retrieves a list of those consultants who are capable of answering questions in the selected categories. Typically the method retrieves this list of consultants by comparing the list of selected categories retrieved in step 701 with the categories listed in entry 213 of the consultant database record 200, for each consultant. When a match is found between a category selected on the matchmaking services web page and a category listed in entry 213, the corresponding consultant is added to the list of consultants who may be capable of answering questions in the selected categories. In step 705 the method computes similarly ratings between the natural language description 215 of the consultants qualifications (FIG. 2) and the natural language description of the new question (see element 500 of FIG. 5).

It may be helpful to describe in more detail how the method, in step 705, computes similarity ratings between the natural language description of the consultant's qualifications (see element 215 of FIG. 2) and the natural language description of the new question (see element 500 of FIG. 5). A number of different techniques can be used to compute this similarity rating. The first technique is term matching in a vector space. In this technique two vectors are plotted on a graph such that the first vector represents the question and the second vector represents the description of the consultant's qualifications. The graph is considered an N-dimensional space, where the number of dimensions, N, is the number of different words that occur at least once in the question or the qualification description, with the exception of those words that are included in a stop word list of terms that have essentially no meaning (for example, words like "the", "and", and "an"). For each of the N dimensions, the coordinate of a vector is equal to the number of times the word assigned to that dimension occurs in the document. Note that a coordinate can be zero if it represents a word that does not occur in one of the documents. The distance between the end points of the two vectors indicates the similarity of the two documents: if the question and the consultant's qualifications are almost exactly the same then the two vecors will be very close together, whereas the vectors will be very far apart if the two documents use different words.

One problem with this technique is that long documents will typically have a higher number of occurrences of a given word. This problem can be avoided by allowing the vectors to represent the proportion of times the word is used in each document.

In yet another embodiment, the words are "weighted" by the number of times the word is used over a given sample space. In practice this means that the system maintains state data about the number of times a given word is used in a set of documents. For example, assume that the word "hypertext" is not a word that is used that often in the world at large but occurs quite often in the document that the system is currently processing. This embodiment would give the word "hypertext" a high "weight" because it is likely that the current document is about "hypertext". The weight of a word is typically determined by dividing the number of times the word is used in the document (or the proportion of times the word is used) by the words frequency in the broader sample space. In this way, words that are often used in a given sample space (e.g., the word "user" is often used in computer-related documents) will be given a lower weight and words that are infrequently used in the sample space (e.g., "hypertext") will be given a higher weight.

Another embodiment modifies the techniques described above by using latent semantic indexing. In latent semantic indexing, it is less important what words are used and more important what the words represent. For example, different words can nevertheless have similar meanings. Therefore, in this embodiment the axis of the graph where the vectors are plotted represents the "sense" or "meaning" of a word. To determine this "sense" or "meaning" the documents in the sample space are processed and it is determined what words are often used together. The thought behind this technique is that if words are often used together then they are probably related to an underlying concept.

A more detailed discussion of these and other techniques that can be used to determine which of the consultants are qualified to answer a customer's question can be found in Automatic Text Processing, The Transformation, Analysis, and Retrieval of Information by Computer, by Gerard Salton, 1989, and in U.S. Pat. No. 5,301,109, which are both incorporated herein by reference.

Returning to the flow diagram of FIG. 7, in step 707, the list of consultants compiled in step 703 is ordered according to the similarly ratings computed in step 705. Typically, the list of consultants is ordered from a consultant whose similarly rating indicates that he or she is most qualified to answer the new question to a consultant whose similarly rating indicates that he or she is the least qualified consultant to answer the new question. Upon completion of step 707 processing ends in this method.

Figure 8A:
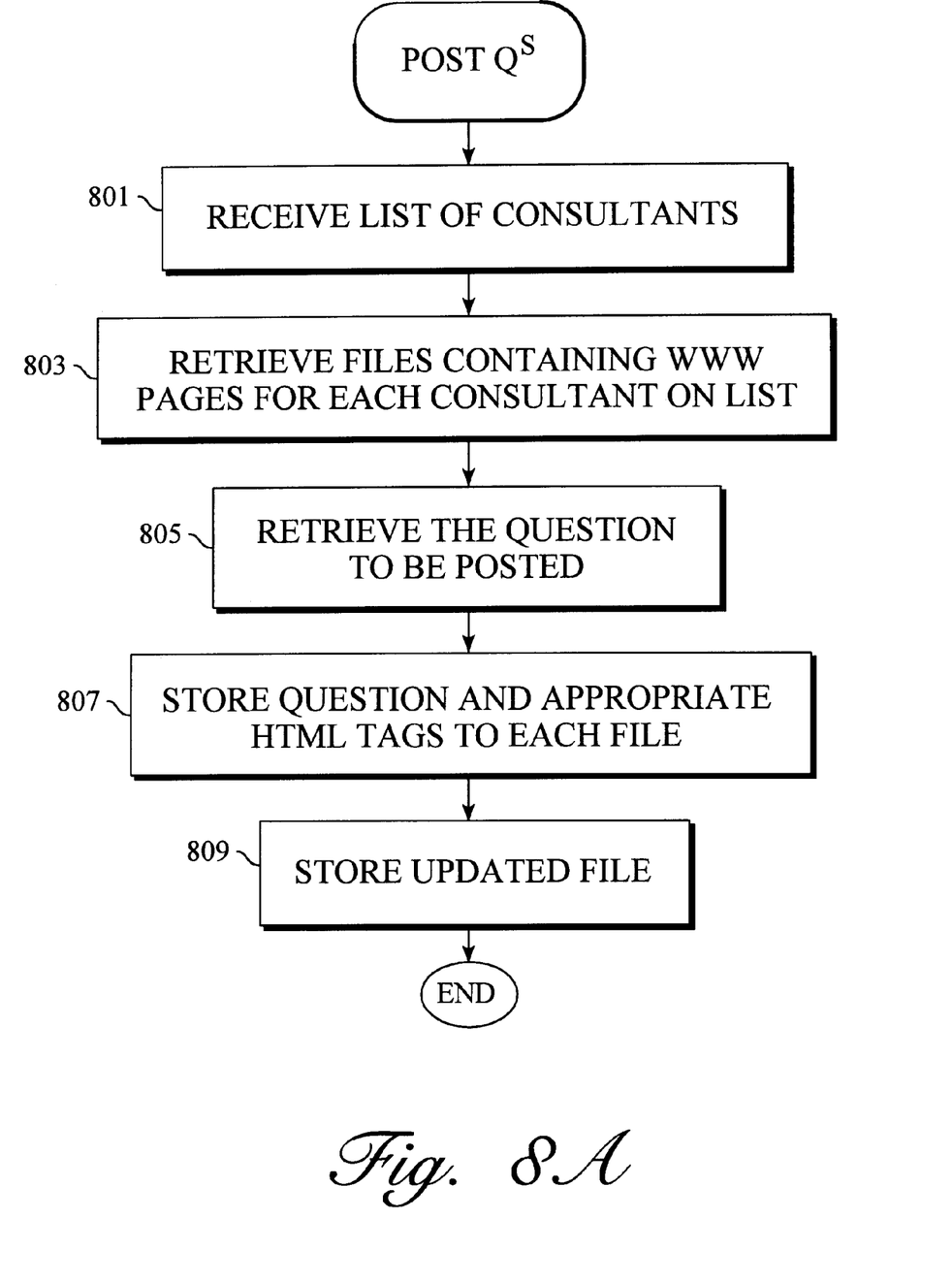
FIG. 8A is a flow diagram illustrating one embodiment for posting questions to a personal web page of a consultant.

FIG. 8A is a flow diagram illustrating one embodiment for posting questions to a personal web page of a consultant. In step 801 the method receives the ordered list of consultants generated in step 707 in FIG. 7. In step 803, the method retrieves, for each consultant on the ordered list, a file which contains the personal web page for the consultant. In step 805 the method retrieves the new question from the matchmaking services web page 500. In step 807, the method stores the new question in the retrieved file. Appropriate HTML tags may be added to each file to improve readability of the new question when displayed as part of the consultant's personal web page. In step 809 the method stores the updated file on a storage medium. Upon completion of step 809 the method of FIG. 8A ends processing.

Figure 8B:
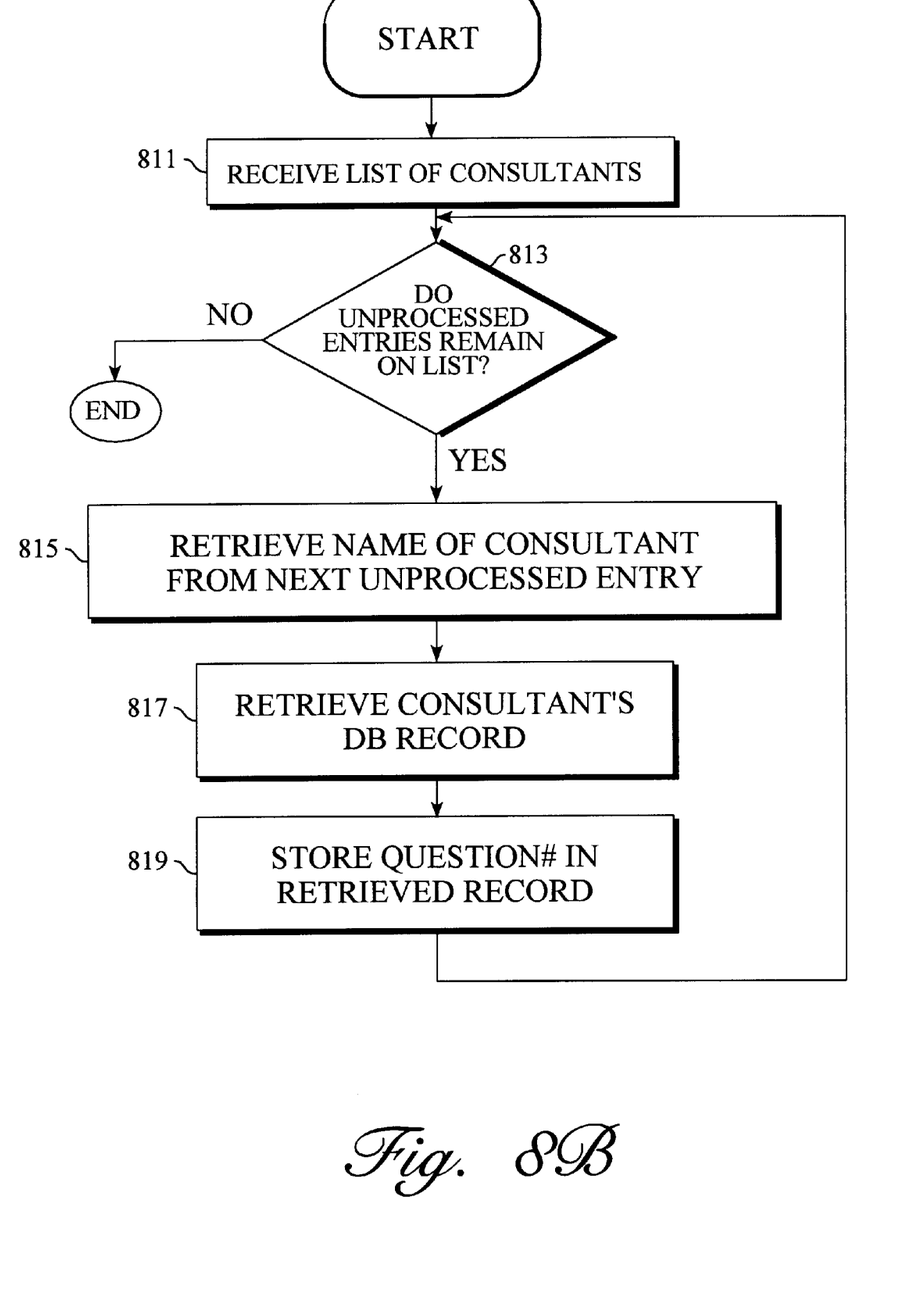
FIG. 8B is a flow diagram which illustrates an alternative embodiment for posting questions to a personal web page of a consultant.

FIG. 8B is a flow diagram which illustrates an alternative embodiment for posting questions to a personal web page of a consultant. In step 811 the method receives the ordered list of consultants generated in step 707 of FIG. 7. In step 813 the method determines whether all entries on the ordered list have been processed. If unprocessed entries remain on the list then processing continues with step 815. In step 815 the method retrieves the name of the consultant associated with the next unprocessed entry. In step 817 the method retrieves the database record 200 corresponding to the consultant's name. In step 819 the method stores, in entry 207 of the consultants database record 200, a number which uniquely identifies the new question. In this way, a second computer program, at a later time, can dynamically build a personal web page for a given consultant by examining the database record to 200 for that consultant, retrieving the unique question numbers from entry 207 from that record, and storing the natural language text corresponding to the question numbers into an HTML template. Moreover, to remove a question from a consultant's personal web page, a third computer program would merely need to delete the corresponding question number from entry 207 of the consultant's database record 200, instead of modifying an HTML file, as would be the case if the method illustrated in FIG. 8A was used. Upon completion of, processing in step 819, processing continues with step 813. If all entries on the order list of consultants have been processed, then processing ends in FIG. 8B.

Figure 9:
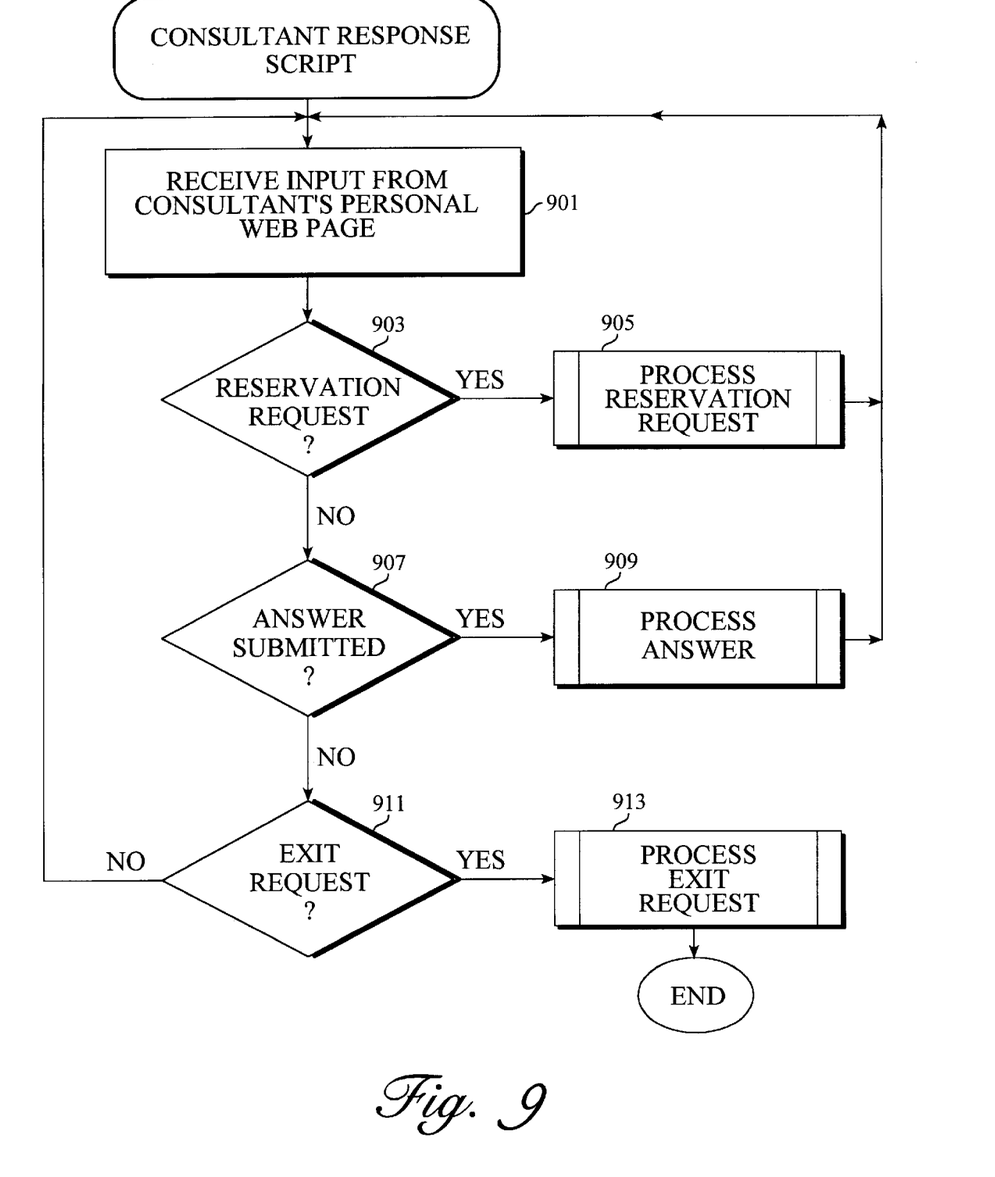
FIG. 9 is a flow diagram illustrating the preferred steps taken to implement the consultant's response script, which processes responses from a consultant's personal web page.
Figure 10A:
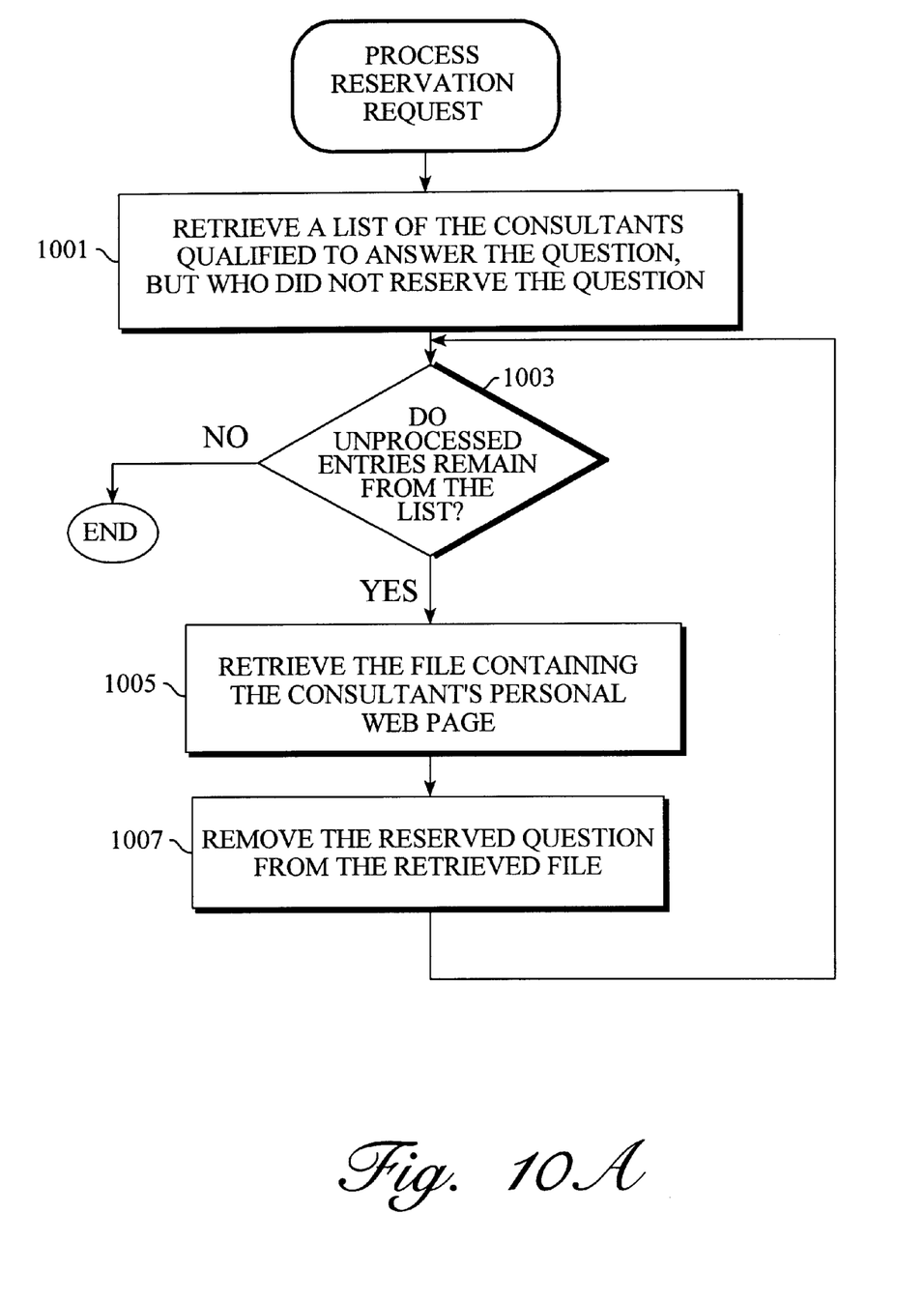
FIG. 10A is a flow diagram illustrating the preferred steps taken to process a request from a consultant to reserve a new question, using an embodiment of the present invention where static copies of a consultant's personal web page are stored in the system.
Figure 10B:
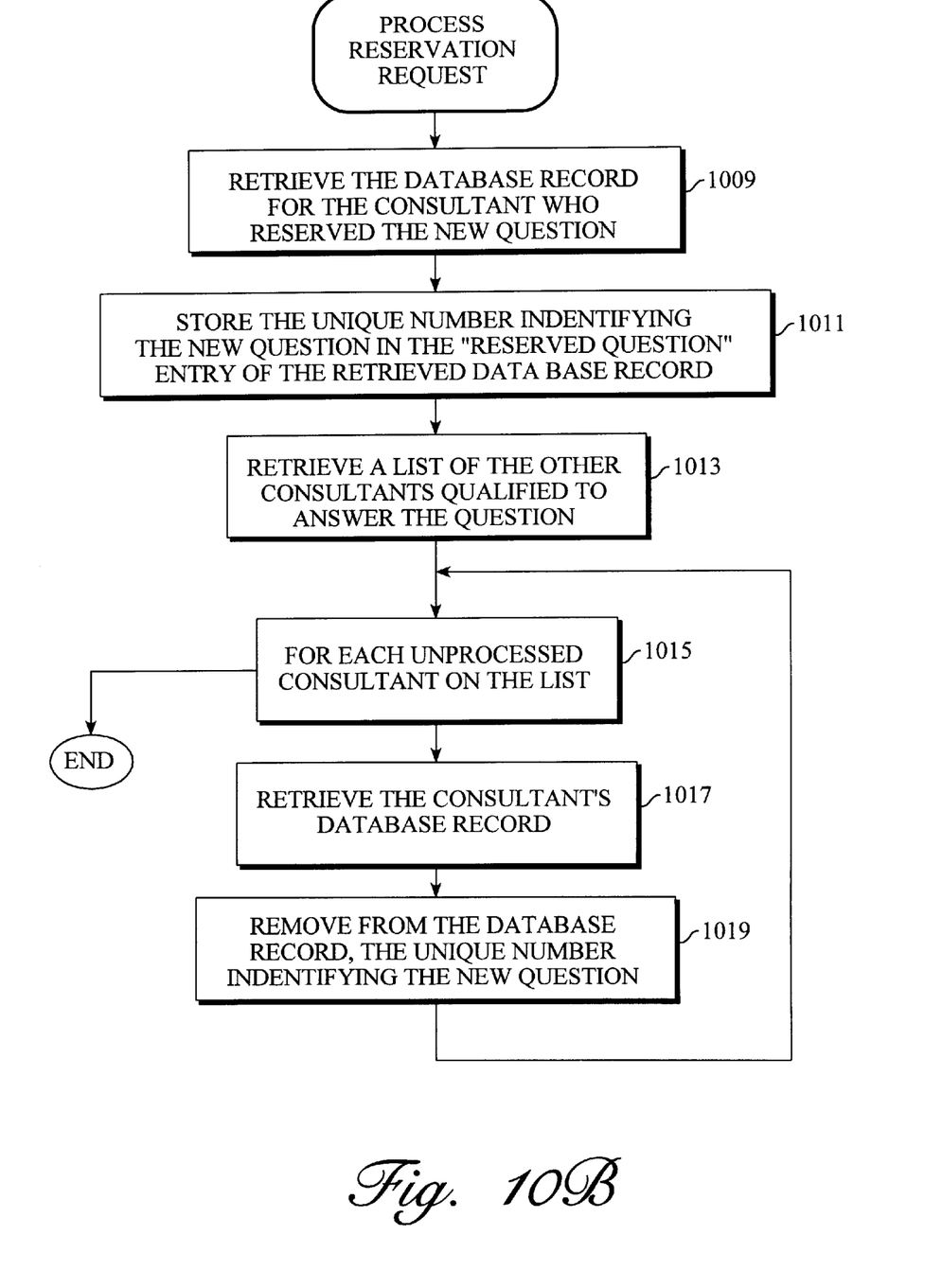
FIG. 10B is a flow diagram illustrating the preferred steps taken to process a request from a consultant to reserve a new question, in an embodiment of present invention where a consultant's personal web page is dynamically generated.

FIG. 9 is a flow diagram illustrating the preferred steps taken to implement the consultant's response script 149, which processes responses from a consultant's personal web page. In step 901 the method receives input from the consultant's personal web page. In step 903 the method determines whether the input is a request to reserve a question so that the consultant can answer the question at a later time. If the input is a reservation request then in step 905, the method of FIG. 9 invokes the method of FIG. 10 in order to process the reservation request. As is discussed in more detail below with reference to FIG. 10, when a consultant reserves a question the system ensures that the requesting consultant is the only consultant given the opportunity to answer the question. Upon completion of step 905 processing continues with step 901.

Returning to step 903, if the input is not a reservation request then processing continues with step 907 to determine whether the input is a submission of an answer to a previously reserved question. If the consultant did submit an answer then, in step 909, the method of FIG. 9 invokes the method of FIG. 11. As is discussed in more detail below with reference to FIG. 11, when a consultant submits an answer the system forwards the answer to the customer. Upon completion of step 909, processing continues with step 901.

Returning to the discussion of step 907, if the consultant did not submit an answer then, in step 911, the method determines whether the input was an exit request. If the input was an exit request then, in step 913, the method of FIG. 9 invokes the method of FIG. 12 to process the exit request.

As will be discussed in more detail below with reference to FIG. 12, when a consultant exits his or her personal web page without reserving a new question, that new question is removed from the consultant's personal web page and added to the personal web page of the consultant whose similarity rating indicates that he or she is the next most qualified consultant to answer the question. Upon completion of step 913 processing ends in FIG. 9.

FIG. 10A is a flow diagram illustrating the preferred steps taken to process a request from a consultant to reserve a new question, using an embodiment of the present invention where static copies of a consultant's personal web page are stored in the system. In step 1001 the method retrieves a list of the consultants who were qualified to answer the new question but who did not reserve the question. In step 1003 the method determines whether all entries from the list have been processed. If unprocessed entries remain, then, in step 1005, the method retrieves the file containing the personal web page of the consultant corresponding to the next unprocessed entry in the list. In step 1007 the method removes the reserved question from the retrieved file. Upon completion of 1007, processing continues with step 1003. When all entries on the retrieved list have been processed, processing ends in FIG. 10A.

FIG. 10B is a flow diagram illustrating the preferred steps taken to process a request from a consultant to reserve a new question, in an embodiment of present invention where a consultant's personal web page is dynamically generated. In step 1009 the method retrieves the database record for the consultant who reserved the new question. In step 1011 the method stores the unique number identifying the new question in the "reserve question" entry of the retrieved database record. In step 1013 the method retrieves a list of the other consultants qualified to answer the question. In step 1015, the method determines whether unprocessed entries from the retrieved list remain. If unprocessed entries do remain, then in step 1017, the method retrieves the database record corresponding to the consultant identified in the next unprocessed record from the list. In step 1019, the method removes from the database record, the unique number identifying the new question. In this way, when the system dynamically generates the personal web page for the consultant, the previously reserved question will not be displayed on the consultant's personal web page. Upon completion of step 1019, processing continues with step 1015. If all entries from the retrieved list have been processed, then processing ends in FIG. 10B.

Figure 11:
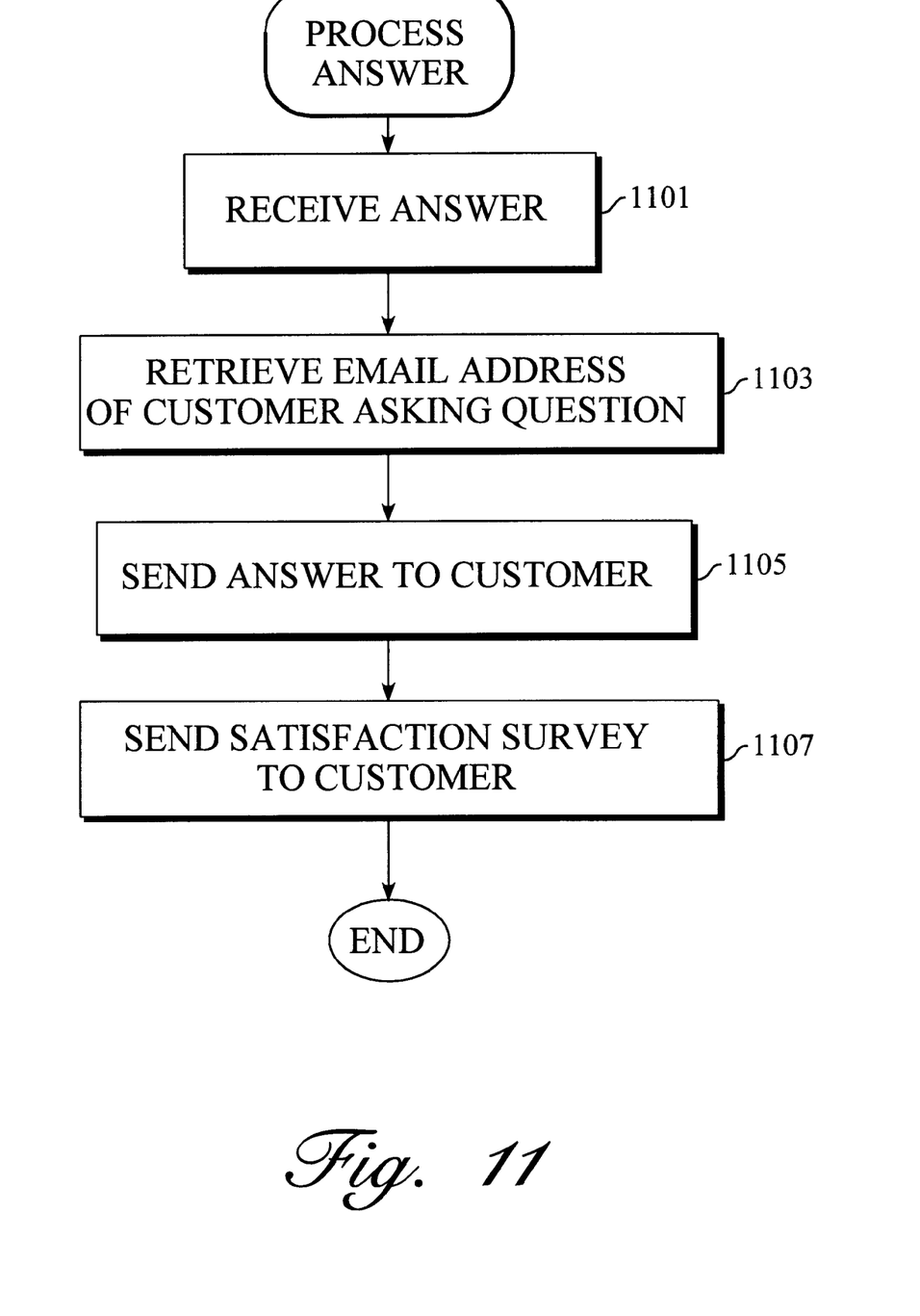
FIG. 11 is a flow diagram illustrating the preferred steps taken to process an answer to a customer's question.

FIG. 11 is a flow diagram illustrating the preferred steps taken to process an answer to a customer's question. In step 1101 the method receives an answer from the consultant's personal web page. In step 1103 the method retrieves the email address of the customer who asked the question. Typically, the customer's email address is retrieved from entry 407 of the customer database record 400 (FIG. 4). In step 1105, the method sends the received answer to the customer at the retrieved email address. In step 1107 the method sends a satisfaction survey to the customer. In this way the customer is able to provide commentary on the services of the consultant who answered the question. Upon completion of step 1107 processing ends in FIG. 11.

As will be discussed in more detail below with reference to FIG. 12, when a consultant exits his or her personal web page without reserving a new question, that new question is removed from the consultant's personal web page and is added to the personal web page of the consultant whose similarity rating indicates that he or she is the next most qualified consultant to answer the question.

Figure 12:
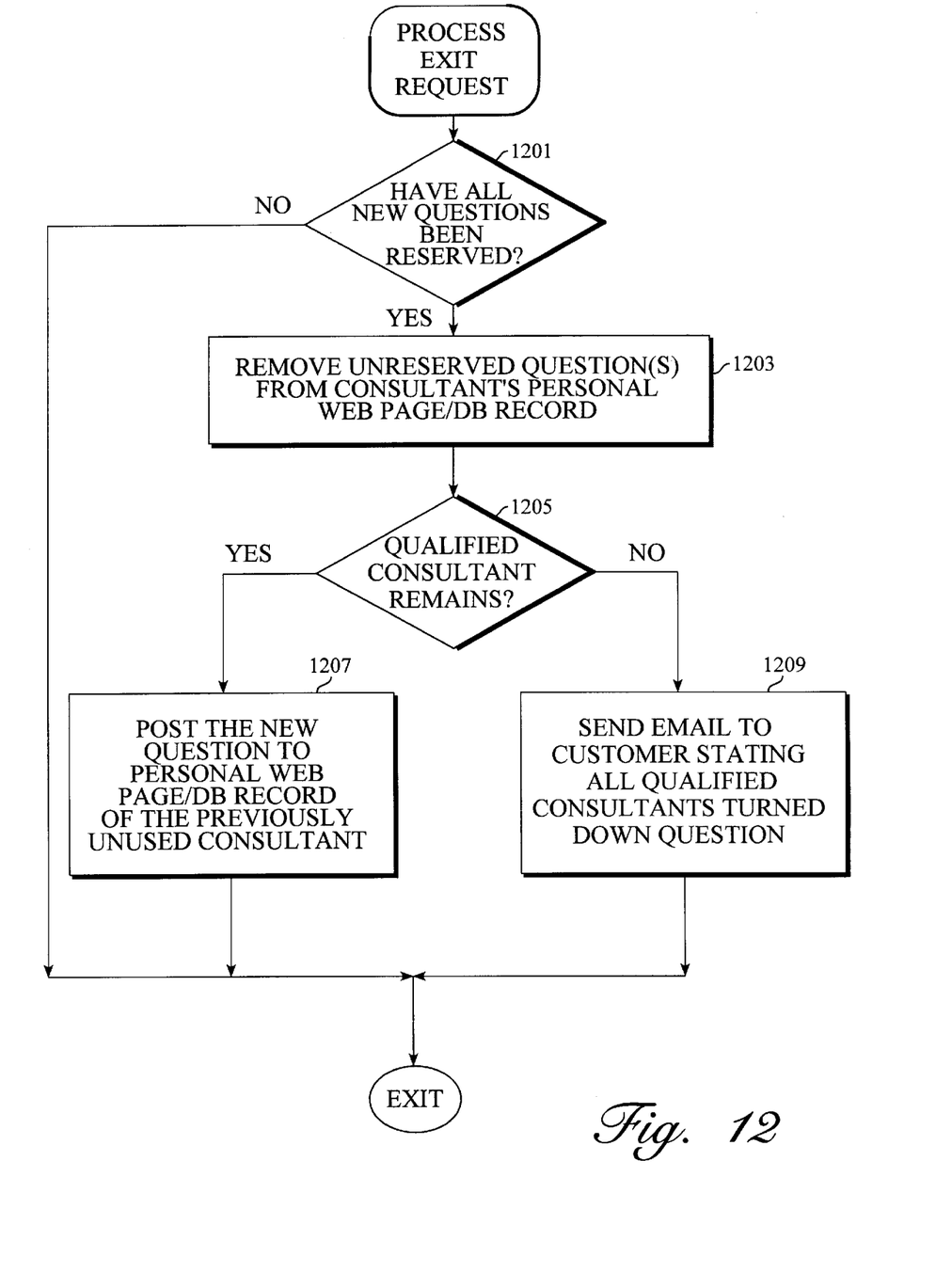
FIG. 12 is a flow diagram illustrating the preferred steps taken in response to an exit request received from the consultant's personal web page.

FIG. 12 is a flow diagram illustrating the preferred steps taken in response to an exit request received from the consultant's personal web page. In step 1201 the method determines whether all the new questions posted to the consultant's personal web page have been reserved. If all the new questions posted to the consultant's personal web page have been reserved then processing continues and step 1203. In a preferred embodiment, the consultant's personal web page maintains state data which indicates whether all the new questions posted to the consultant's personal web page have been reserved. In step 1203, the method removes all unreserved questions from the consulstant's personal web page. In an embodiment where the consultant's personal web page is statically maintained, step 1203 requires that the unreserved questions be physically removed from the file containing the consultant's personal web page. In an embodiment where the personal web page is dynamically generated, step 1203 requires removing the unique number identifying each unreserved question from the consultant's database record 200 (FIG. 2). For each unreserved question the method determines whether a consultant exists in the system who is qualified to answer the unreserved question but who has not had the unreserved question posted to his or her personal web page. If such a qualified consultant exists, then step in 1207 the method posts the unreserved question to the personal web page of that consultant. Upon completion of step 1207 the method of FIG. 12 ends processing.

Returning to the discussion of step 1205, if no such qualified consultants remain, then in 1209, the method sends an email to the customer stating that none of the qualified consultants answered the customer's question. Upon completion of step 1209, processing ends in FIG. 12. Similarly, in step 1201 if all new questions posted to the consultant's personal web page have been reserved for later answering, then processing in FIG. 12 ends.

While specific embodiments have been described herein for purposes of illustration, various modifications may be made without departing from the spirit and scope of the invention. It is intended that the spirit and scope of the invention are to be defined by reference to the following claims, along with their full scope of equivalents.

What is claimed is:

1. A computer implemented method for facilitating the exchange of information between human users in a networked computer environment, comprising the steps of:

receiving an information request from a human customer user via a customer computer, wherein the information request does not specify a source from which the requested information can be obtained;

determining, based upon the information request and a set of consultant qualification information, at least one qualified human consultant user qualified to provide the requested information;

soliciting the requested information from the qualified consultant user;

determining whether the qualified consultant user wishes to provide the requested information;

in response to an indication that the qualified consultant user wishes to provide the requested information, receiving the requested information from the qualified consultant user via a consultant computer; and sending the requested information to the customer user via the customer computer.

2. The method of claim 1, wherein the step of determining at least one qualified human consultant user comprises the steps of:

performing a natural language analysis on the information request;

performing a natural language analysis on the set of consultant qualification information; and selecting at least one qualified human consultant user based upon a comparison of the natural language analysis of the information request and the natural language analysis of the consultant qualification information.

3. The method of claim 1, wherein the information request includes information on one or more categories, each category indicating a topic area to which the information request pertains, wherein the consultant qualification information includes at least one area of expertise for each consultant user, and wherein the step of determining at least one qualified human consultant user comprises the step of:

selecting at least one qualified human consultant user based upon a comparison of the one or more categories in the information request with the at least one area of expertise of each consultant user.

4. The method of claim 1, wherein the step of soliciting comprises the step of:

posting the information request to a web page associated with the qualified consultant user.

5. The method of claim 4, wherein the information request posted to the web page associated with the qualified consultant user does not include any information pertaining to the customer user who submitted the information request.

6. The method of claim 1, further comprising the steps of:

in response to an indication that the qualified consultant user does not wish to provide the requested information, determining, based upon the information request and the set of consultant qualification information, at least one other qualified human consultant user qualified to provide the requested information; and soliciting the requested information from the other qualified consultant user.

7. A system for facilitating the exchange of information between human users in a networked computer environment, comprising:

a mechanism configured to receive an information request from a human customer user via a customer computer, wherein the information request does not specify a source from which the requested information can be obtained;

a mechanism configured to determine, based upon the information request and a set of consultant qualification information, at least one qualified human consultant user qualified to provide the requested information;

a mechanism configured to solicit the requested information from the qualified consultant user;

a mechanism configured to determine whether the qualified consultant user wishes to provide the requested information;

a mechanism configured to receive, in response to an indication that the qualified consultant user wishes to provide the requested information, the requested information from the qualified consultant user via a consultant computer; and a mechanism configured to send the requested information to the customer user via the customer computer.

8. The system of claim 7, wherein the mechanism configured to determine at least one qualified human consultant user comprises:

a mechanism configured to perform a natural language analysis on the information request;

a mechanism configured to perform a natural language analysis on the set of consultant qualification information; and a mechanism configured to select at least one qualified human consultant user based upon a comparison of the natural language analysis of the information request and the natural language analysis of the consultant qualification information.

9. The system of claim 7, wherein the information request includes information on one or more categories, each category indicating a topic area to which the information request pertains, wherein the consultant qualification information includes at least one area of expertise for each consultant user, and wherein the mechanism configured to determine at least one qualified human consultant user comprises:

a mechanism configured to select at least one qualified human consultant user based upon a comparison of the one or more categories in the information request with the at least one area of expertise of each consultant user.

10. The system of claim 7, wherein the mechanism configured to solicit comprises:

a mechanism configured to post the information request to a web page associated with the qualified consultant user.

11. The system of claim 10, wherein the information request posted to the web page associated with the qualified consultant user does not include any information pertaining to the customer user who submitted the information request.

12. The system of claim 7, further comprising:

a mechanism configured to determine, in response to an indication that the qualified consultant user does not wish to provide the requested information, and based upon the information request and the set of consultant qualification information, at least one other qualified human consultant user qualified to provide the requested information; and     a mechanism configured to solicit the requested information from the other qualified consultant user.

13. A computer program product for facilitating the exchange of information between human users in a networked computer environment, comprising:

code for causing one or more processors to receive an information request from a human customer user via a customer computer, wherein the information request does not specify a source from which the requested information can be obtained;

code for causing one or more processors to determine, based upon the information request and a set of consultant qualification information, at least one qualified human consultant user qualified to provide the requested information;

code for causing one or more processors to solicit the requested information from the qualified consultant user;

code for causing one or more processors to determine whether the qualified consultant user wishes to provide the requested information;

code for causing one or more processors to receive, in response to an indication that the qualified consultant user wishes to provide the requested information, the requested information from the qualified consultant user via a consultant computer; and     code for causing one or more processors to send the requested information to the customer user via the customer computer.

14. The computer program product of claim 13, wherein the code for causing one or more processors to determine at least one qualified human consultant user comprises:

code for causing one or more processors to perform a natural language analysis on the information request;

code for causing one or more processors to perform a natural language analysis on the set of consultant qualification information; and     code for causing one or more processors to select at least one qualified human consultant user based upon a comparison of the natural language analysis of the information request and the natural language analysis of the consultant qualification information.

15. The computer program product of claim 13, wherein the information request includes information on one or more categories, each category indicating a topic area to which the information request pertains, wherein the consultant qualification information includes at least one area of expertise for each consultant user, and wherein the code for causing one or more processors to determine at least one qualified human consultant user comprises:

code for causing one or more processors to select at least one qualified human consultant user based upon a comparison of the one or more categories in the information request with the at least one area of expertise of each consultant user.

16. The computer program product of claim 13, wherein the code for causing one or more processors to solicit comprises:

code for causing one or more processors to post the information request to a web page associated with the qualified consultant user.

17. The computer program product of claim 16, wherein the information request posted to the web page associated with the qualified consultant user does not include any information pertaining to the customer user who submitted the information request.

18. The computer program product of claim 13, further comprising:

code for causing one or more processors to determine, in response to an indication that the qualified consultant user does not wish to provide the requested information, and based upon the information request and the set of consultant qualification information, at least one other qualified human consultant user qualified to provide the requested information; and     code for causing one or more processors to solicit the requested information from the other qualified consultant user.

* * * * *